(12) United States Patent
DeBusk

(10) Patent No.: US 7,179,387 B2
(45) Date of Patent: *Feb. 20, 2007

(54) TREATMENT SYSTEM AND METHOD FOR REMEDIATING A BODY OF WATER

(76) Inventor: Thomas A. DeBusk, 3208 Westchester Dr., Cocoa, FL (US) 32926

( * ) Notice: Subject to any disclaimer, the term of this patent is extended or adjusted under 35 U.S.C. 154(b) by 368 days.

This patent is subject to a terminal disclaimer.

(21) Appl. No.: 10/770,004

(22) Filed: Feb. 2, 2004

(65) Prior Publication Data

US 2004/0154990 A1    Aug. 12, 2004

Related U.S. Application Data

(60) Provisional application No. 60/445,988, filed on Feb. 6, 2003, provisional application No. 60/504,805, filed on Sep. 22, 2003.

(51) Int. Cl.
*C02F 1/00* (2006.01)
(52) U.S. Cl. .................. 210/747; 73/64.56; 73/863; 210/85; 210/96.1; 210/170; 210/198.1; 210/601; 210/602; 210/610; 210/614; 210/702; 405/80; 405/107
(58) Field of Classification Search ............ 210/85, 210/121, 143, 170, 198.1, 242.1, 602, 614, 210/739, 747, 749, 764, 96.1, 601, 610, 702; 405/37, 39, 52, 80, 107; 73/64.56, 863
See application file for complete search history.

(56) References Cited

U.S. PATENT DOCUMENTS

| | | | |
|---|---|---|---|
| 4,507,206 A | * | 3/1985 | Hughes ............ 210/709 |
| 4,765,914 A | * | 8/1988 | Marikovsky et al. ....... 210/716 |
| 4,818,416 A | | 4/1989 | Eberhardt |
| 5,733,453 A | | 3/1998 | DeBusk |
| 5,766,474 A | | 6/1998 | Smith et al. |
| 5,893,978 A | * | 4/1999 | Yoda et al. ............... 210/747 |
| 5,993,649 A | | 11/1999 | DeBusk et al. |
| 6,413,426 B1 | | 7/2002 | DeBusk et al. |

(Continued)

OTHER PUBLICATIONS

Lake Apopka Water Hyacinth Demonstration Project, Second Semi-Annual Report prepared for St. Johns River Water Management District, prepared by Amasek, Inc., Apr. 4, 1991.

Debusk et al., "Effectiveness of Mechanical Aeration in Floating Aquatic Macrophyte-Based Wastewater Treatment Systems," Journal of Environmental Quality, vol. 18, No. 3, pp. 349-354, Jul.-Sep. 1989.

(Continued)

*Primary Examiner*—Joseph Drodge
(74) *Attorney, Agent, or Firm*—Allen, Dyer, Doppelt, Milbrath & Gilchrist, P.A.

(57) ABSTRACT

A method for remediating a body of water includes sequestering a sector of water within the body of water. A communications channel is established between the water sector and a supply site. The water sector is at least partially remediated using the channel to alter a composition and/or a state of the water in the water sector. The channel may be used to add a chemical or nutrient; to provide air or water for mixing the column contents; to convey an electrical signal to an element such as a valve, sensor, or pump in the water sector; to withdraw samples and/or components from the water sector; or to obtain information therefrom via electrical signals. Following the remediation, the remediated water is exchanged with water to be treated from the body of water. In this way, the body of water is remediated over time.

34 Claims, 2 Drawing Sheets

U.S. PATENT DOCUMENTS 6,575,662 B2 * 6/2003 French .................. 405/80
6,692,641 B2 2/2004 DeBusk et al.
7,014,776 B1 * 3/2006 DeBusk .................. 210/711

OTHER PUBLICATIONS

Clark, Mark, "Biophysical Characterization of Floating Wetlands (Flotant) and Vegetative Succession a Warm-Temperature Aquatic Ecosystem," Dissertation, University of Florida 2000.

Wen, Li and Recknagel, Friedrich, "In Situ Removal of Dissolved Phosphorus in Irrigation Drainage Water by Planted Floats: Preliminary Results from Growth Chamber Experiment," Agriculture, Ecosystems and Environment, vol. 90, pp. 9-15, Jun. 2002.

Youngchul, Kim and Wan-Joong, Kim, "Roles of Water Hyacinths and Their Roots for Reducing Algal Concentration in the Effluent from Waste Stabilization Ponds," Water Research, vol. 34, No. 13, pp. 3285-3294, Sep. 1, 2002.

* cited by examiner

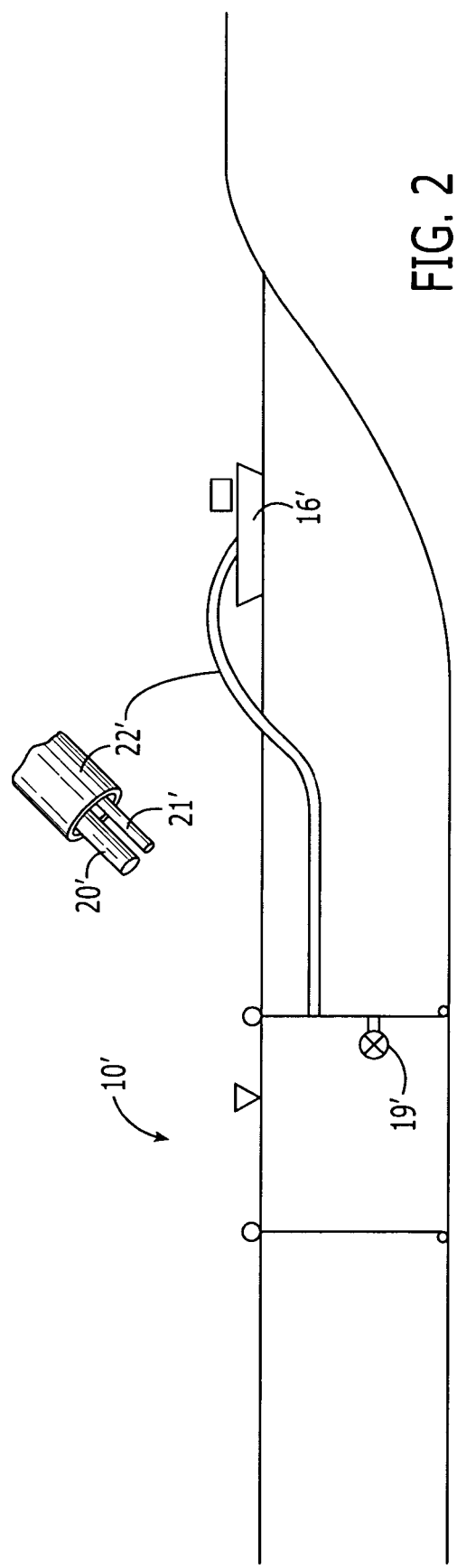

TREATMENT SYSTEM AND METHOD FOR REMEDIATING A BODY OF WATER

CROSS-REFERENCE TO RELATED APPLICATIONS

This application claims priority to provisional patent applications Serial No. 60/445,988, "Algal and Nutrient Control System and Method for a Body of Water," filed Feb. 6, 2003, and Serial No. 60/504,805, "Treatment System and Method for Remediating a Body of Water," filed Sep. 22, 2003.

BACKGROUND OF THE INVENTION

1. Field of the Invention

The present invention relates to systems and methods of water purification, and, more particularly, the control of nutrients, suspended and filamentous algae, pollutants, and toxins in bodies of water.

2. Description of Related Art

Many freshwater lakes and ponds, as well as estuaries, are characterized, particularly during the warmer months, by a significant population of suspended algae or phytoplankton in the water body's water column. These largely unicellular plants give the water a greenish and often a "pea-soup" appearance that many observers find unattractive. Floating mats of unsightly, filamentous algae also can occur. High concentrations of algae may lead to low levels of dissolved oxygen in the early morning hours, leading to stress on the aquatic and fish populations. In extreme cases, these conditions will lead to fish kills and the general decline of the quality of a water body.

The basis of the problem is an abundance of soluble nutrients within the water body, which then allows the rapid growth and maintenance of the elevated population of suspended or filamentous algae. The source of the soluble nutrients may be sediments, air deposition, point source polluting discharges, generalized, non-point-source inflows, or most likely a combination of all these factors. An effective management strategy would combine elements of attempting to reduce nutrient loading to the water body with treatment of the water body itself.

Currently used methods of controlling algal growth in ponds or lakes typically involve treating the water with selected herbicides or "algicides." These chemicals kill the suspended algae, returning the water to its more desired appearance of clear or only slightly colored waters. Another strategy employed in managing algae is to introduce a dye that then, via the mechanism of shading, achieves the same result of killing the algae and returning the water to its algae-free appearance.

A problem with these approaches is that the underlying feature that initially encouraged the growth of the algae remains; that is, the nutrients on which the algae grew remain in the water, and after the effects of the algicide, herbicide, or dye decrease, the conditions for a renewed growth of algae are abundantly present. In addition, for the algicide and herbicide at least, the negative environmental effects of potentially toxic accumulation must be considered.

An alternative strategy to killing the algae and then creating relatively clear but nutrient-rich water body is to employ technologies that remove these nutrients from the water body. A natural method of achieving this nutrient removal is through the harvesting of macrophyte vegetation, which takes up the soluble nutrients as a function of their growth. If the total mass of nutrients removed through plant harvest were to match the ongoing nutrient loading through the various sources of sediment transport, air deposition point and nonpoint sources, then the lake or pond would be able to maintain an algal-free appearance. Another alternative approach is to immobilize water column phosphorus by adding a chemical coagulant, such as aluminum sulfate.

Another site of contaminated water is the so-called "waste stabilization pond" (WSP), a body of water used to store industrial, municipal, agricultural wastewater or contaminated groundwater. The WSP is believed to be the most prevalent type of wastewater treatment technology in the world. There is an immediate need to enhance the pollutant removal effectiveness of most WSPs.

SUMMARY OF THE INVENTION

The system and method of the present invention are directed to the remediation of water bodies and estuaries, particularly fresh water bodies and estuaries, including natural and manmade bodies of water such as waste stabilization ponds. A plurality of embodiments are contemplated, a best mode among which is dependent upon the characteristics of each specific body of water, as determinable by measurements of water chemistry, including contaminant types and levels.

A method of the present invention for remediating a body of water comprises the steps of sequestering a sector of water within a body of water. The water sector has a volume that is significantly less than that of the body of water. A communications channel is established between the sequestered water sector and a remote supply site situated, for example, at the shore of the water body or on a supply structure on the surface of the body of water. Such a supply structure may comprise, for example, a raft or vessel floating atop the body of water spaced apart from the water column, although this is not intended as a limitation. The supply site contains at least one instrument, such as, but not intended to be limited to, a pump, a reservoir for holding a composition for introduction into the water sector, a controller, or a sensor signal receiving device.

The sequestered water sector is then at least partially remediated using the channel to introduce a remediation means into the water sector. The remediation means is selected to alter at least one of a composition and a state of water in the water sector. For example, the channel may be used to add a chemical or nutrient, to provide air or water for mixing the sector contents, or to convey an electrical signal to an element in the water sector to control elements such as valves or pumps. The channel may also be used to withdraw samples and/or components from the water sector or to obtain information therefrom via electrical signals.

Following the remediation, the at least partially remediated water in the sequestered water sector is exchanged with water to be treated from the body of water. In this way, then, the body of water is incrementally remediated over time.

The features that characterize the invention, both as to organization and method of operation, together with further objects and advantages thereof, will be better understood from the following description used in conjunction with the accompanying drawing. It is to be expressly understood that the drawing is for the purpose of illustration and description and is not intended as a definition of the limits of the invention. These and other objects attained, and advantages offered, by the present invention will become more fully apparent as the description that now follows is read in conjunction with the accompanying drawing.

BRIEF DESCRIPTION OF THE DRAWINGS

FIG. 2 view of a second embodiment of the system using a floating supply system.

DETAILED DESCRIPTION OF THE PREFERRED EMBODIMENTS

Figure 1:
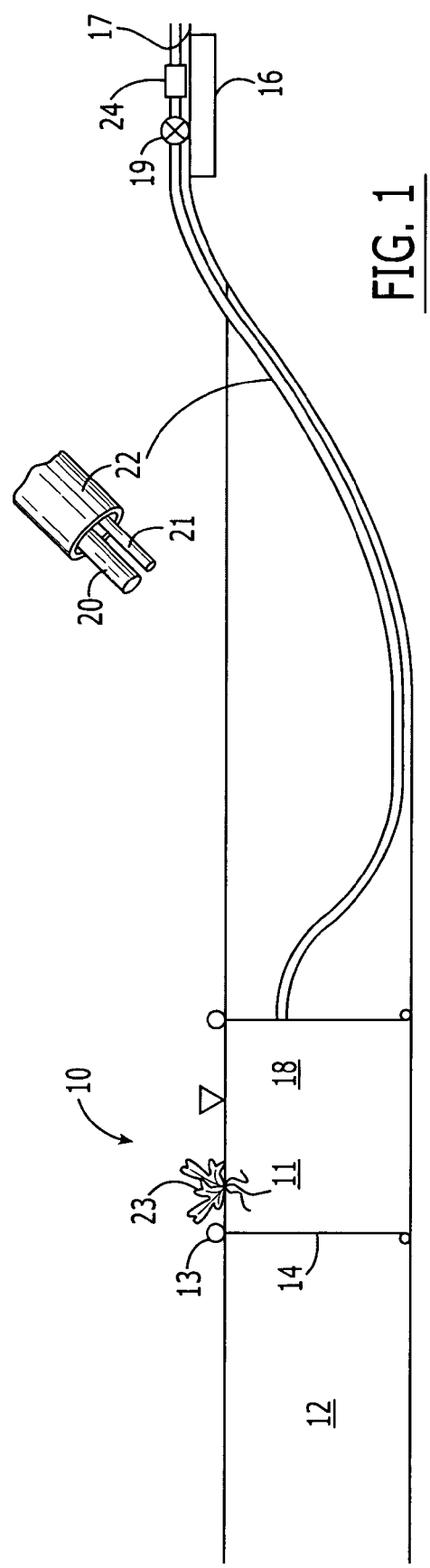
FIGS. 1 of a first embodiment of the system of the present invention using a shorebased supply system.

A description of the preferred embodiments of the present invention will now be presented with reference to FIGS. 1 and 2.

Two embodiments of the system and method of the present invention for remediating a body of water will be discussed, wherein a primary difference lies in the positioning of a supply system and pump. The reference numerals unrelated to the supply system otherwise remain the same in both FIGS. 1 and 2, with primes used to distinguish analogous elements in FIG. 2.

In these embodiments, the sequestration is accomplished in a substantially vertical column of water; however, one of skill in the art will recognize that sequestration may also include alternate sector configurations dependent, for example, upon the geometry of the body of water and/or other factors, and thus no limitation is to be inferred thereby.

The systems 10,10' comprise means for sequestering a substantially vertical column of water 11 within a body of water 12. The water column 11 may be created, for example, using a floating boom 13 and flexible water-impermeable barrier 14 such as, but not intended to be limited to, plastic sheeting. The footprint of the water column 11 may vary, for example, from 0.5–50% of the surface 15 of the water body 12, although this is not intended as a limitation, and will be decided based upon the conditions.

A communications channel (an "umbilical line") is established between the water column 11 and a supply site 16 situated either at the shore 17 of the water body 12 (FIG. 1) or a supply structure 16' comprising a base and at least one instrument on the surface of the body of water 12 (FIG. 2). In either case, the supply system 16,16' is adapted to provide a means for remediating the water 18 in the column 11.

In most embodiments, a pump 19,19' will be used to effect water transfer between the water column 11 and the water body 12 outside the column. In the first embodiment, the pump 19 is situated on the shore 17 as part of the supply structure 16 (FIG. 1); in the second, the pump 19' is situated within the water column 11.

The water column 11 is remediated using the channel to alter at least one of a composition and a state of the water column 11. For example, the channel may comprise a fluid communications channel 20,20' extending between the water column 11 and the pump 19 in the first embodiment, and between the water column 11 and the supply structure 16' in the second embodiment. The channels 20,20' may be used, for example, to add a chemical or nutrient or to provide air or water for mixing the column contents. The channel 20,20' may also be used to withdraw samples and/or components from the water column 11. Withdrawn samples can then be tested for chemical, physical, and/or biological characteristics as desired. Alternatively, a desired composition may be added to the withdrawn water, which is then reintroduced into the water column 11. The channel 20,20' may be used to remove undesired material such as debris and accumulated flocs, if a chemical flocculation remediation method is used.

The channel may also comprise electrical wiring 21,21' within a conduit 22,22'. The wiring 21,21' is adapted to convey an electrical signal to an element positioned in the water column 11 to control elements such as valves or pumps, or to obtain information therefrom via electrical signals, such as meters or other sensing elements.

In a preferred embodiment, the channels 20,20',21,21' are contained within a conduit such as at least one tube or pipe 22,22'.

Following the remediation, or continuously at a predetermined flow rate, the remediated water 18 is exchanged with water to be treated from the body of water 12. In this way, then, the body of water 12 is remediated over time.

The method of remediation may be selected among at least one of a chemical, physical, or biological process under control of elements deployed within the water column 11. For example, wetland vegetation 23 may be used to introduce a number of pollutant-removal processes, as are known in the art. Chemicals may be added to induce coagulation and flocculation of pollutants, as is known in the art. Nutrients may be added to stimulate plant growth and microbial activity.

Control over the system 10,10' may be achieved by any of a number of methods known in the art, for example, manually or automatically using a controller 24 that is programmed for desired conditions, such as pump run times, or water condition monitoring.

It may be appreciated by one skilled in the art that additional embodiments may be contemplated, and that many processes may be utilized in concert to achieve water remediation, such as plant uptake and harvesting of contaminants, the transformation and stripping into the atmosphere of nitrogen, and the sequestering and/or immobilization of phosphorus by coagulants into sediment.

In the foregoing description, certain terms have been used for brevity, clarity, and understanding, but no unnecessary limitations are to be implied therefrom beyond the requirements of the prior art, because such words are used for description purposes herein and are intended to be broadly construed. Moreover, the embodiments of the system illustrated and described herein are by way of example, and the scope of the invention is not limited to the exact details of construction.

Having now described the invention, the construction, the operation and use of preferred embodiments thereof, and the advantageous new and useful results obtained thereby, the new and useful constructions, and reasonable mechanical equivalents thereof obvious to those skilled in the art, are set forth in the appended claims.

What is claimed is:

1. A method for remediating a body of water comprising the steps of:
    sequestering a sector of water within a body of water, the water sector having a volume significantly less than a total volume of the body of water;
    establishing a communications channel between the water sector and a remote supply site distinct from and situated adjacent the body of water;
    at least partially remediating the water sector using a remediation means introduced thereinto via the channel to alter at least one of a composition and a state of water in the water sector;
    and exchanging remediated water from the water sector with water to be treated from the body of water;
    and further comprising the step of withdrawing via the communications channel a sample of water from the water sector and testing the withdrawn sample for at least one of a chemical, a physical, and a biological characteristic thereof.

2. The method recited in claim 1 wherein the water sector comprises a substantially vertical column of water.

3. The method recited in claim 2, wherein the sequestering step comprises suspending a substantially water-impermeable barrier from a floating support to form the water column.

4. The method recited in claim 3, wherein the barrier comprises a flexible plastic sheeting material.

5. The method recited in claim 1, wherein the water sector volume is in a range of approximately 0.5–50% of the total volume of the body of water.

6. The method recited in claim 1, wherein the remote supply site comprises at least one of a supply structure positioned on a shore of the water body and a supply structure positioned in contact with the body of water.

7. The method recited in claim 6, wherein the supply structure is positioned on a base floating atop the body of water.

8. The method recited in claim 1, wherein the channel comprises at least one of a fluid communications channel and an electrical signal-carrying conduit.

9. The method recited in claim 1, further comprising the step of withdrawing undesired material from the water sector via the communications channel.

10. The method recited in claim 1, wherein the remediation means comprises a pump positioned within the water sector, and the communications channel comprises electrical wiring connected in controlling relation to the pump.

11. The method recited in claim 10, wherein the remediating step comprises establishing an automatic programmed control of the pump.

12. The method recited in claim 10, further comprising the step of mixing water in the water sector using the pump.

13. The method recited in claim 1, wherein the communications channel comprises electrical wiring, and further comprising the steps of sensing a water-characteristic parameter within the water sector, and sending a signal via the wiring, the signal indicative of the sensed parameter.

14. The method recited in claim 13, wherein the remediating step comprises establishing an automatic programmed control of the sensing and sending steps.

15. The method recited in claim 1, wherein the exchanging step comprises using a pump.

16. The method recited in claim 15, wherein the pump is positioned at one of a location at the supply site and within the water sector.

17. A method for remediating a body of water comprising the steps of:
sequestering a sector of water within a body of water, the water sector having a volume significantly less than a total volume of the body of water;
establishing a communications channel between the water sector and a remote supply site situated adjacent the body of water;
at least partially remediating the water sector using a remediation means introduced thereinto via the channel to alter at least one of a composition and a state of water in the water sector;
exchanging remediated water from the water sector with water to be treated from the body of water;
withdrawing via the communications channel a sample of water from the water sector and testing the withdrawn sample for at least one of a chemical, a physical, and a biological characteristic thereof;
adding a desired composition thereto; and
reintroducing the water sample having the desired composition hereinto into the water sector via the communications channel.

18. A system for remediating a body of water comprising:
means for sequestering a sector of water within a body of water, the water sector having a volume significantly less than a total volume of the body of water;
a communications channel between the water sector and a remote supply site situated adjacent the body of water;
means for at least partially remediating the water sector using a remediation means introduced thereinto via the channel to alter at least one of a composition and a state of water in the water sector;
means for exchanging remediated water from the water sector with water to be treated from the body of water; and further comprising the step of,
withdrawing via the communications channel a sample of water sector and testing the withdrawn sample for at least one of a chemical, a physical, and a biological characteristic thereof.

19. The system recited in claim 18, wherein the sequestering means comprises means for sequestering a substantially vertical column of water.

20. The system recited in claim 19, wherein the sequestering means comprises a floating support and a substantially water-impermeable barrier suspended from the support to form the water column.

21. The system recited in claim 20 wherein the barrier comprises a flexible plastic sheeting material formed into a cylinder.

22. The system recited in claim 18, wherein the sequestering means is adapted to sequester a water sector volume in a range of approximately 0.5–50% of the total volume of the body of water.

23. The system recited in claim 18, further comprising the remote supply site comprising at least one of a supply structure positioned on a shore of the water body and a supply structure positioned in contact with the body of water.

24. The system recited in claim 23, wherein the supply structure comprises a base floating atop the body of water and at least one instrument positioned on the base.

25. The system recited in claim 18, wherein the channel comprises at least one of a fluid communications channel and an electrical signal-carrying conduit.

26. The system recited in claim 18, further comprising means for withdrawing undesired material from the water sector via the communications channel.

27. The system recited in claim 18, wherein the remediation means comprises a pump positioned within the water sector, and the communications channel comprises electrical wiring connected in controlling relation to the pump.

28. The system recited in claim 27, wherein the remediating means comprises a controller programmable to establish an automatic programmed control of the pump.

29. The system recited in claim 18, further comprising a mixing pump for mixing water in the water sector.

30. The system recited in claim 18, wherein the communications channel comprises electrical wiring, and further comprising a sensor for sensing a water-characteristic parameter within the water sector, the sensor in communication with the wiring for sending a signal therealong indicative of the sensed parameter.

31. The system recited in claim 30, wherein the remediating means comprises a controller adapted to establish an automatic programmed control of the sensor.

32. The system recited in claim 18, wherein the exchanging means comprises a pump in fluid communication with the water sector and the body of water.

33. The system recited in claim 32, wherein the pump is positioned at one of a location at the supply site and within the water sector.

34. A system for remediating a body of water comprising:
means for sequestering a sector of water within a body of water, the water sector having a volume significantly less than a total volume of the body of water;
a communications channel between the water sector and a remote supply site situated adjacent the body of water;
means for at least partially remediating the water sector using a remediation means introduced thereinto via the channel to alter at least one of a composition and a state of water in the water sector;
means for exchanging remediated water from the water sector with water to be treated from the body of water;
means for withdrawing via the communications channel a sample of water from the water sector and testing the withdrawn sample for at least one of a chemical, a physical, and a biological characteristic thereof;
means for adding a desired composition thereto; and
means for introducing the water sample having the desired composition therein into the water sector via the communications channel.

* * * * *